United States Patent [19]

Pfistershammer

[11] Patent Number: 4,787,385
[45] Date of Patent: Nov. 29, 1988

[54] METHOD AND APPARATUS FOR FREEZE BRANDING AND DEHORNING

[76] Inventor: Joseph Pfistershammer, 22, 11-19 Stirling Road, Claremont, Australia

[21] Appl. No.: 15,777

[22] Filed: Jan. 13, 1987

Related U.S. Application Data

[60] Continuation of PCT AU86/00127 filed May 7, 1986 published as WO86/06583 on Nov. 20, 1986.

[30] Foreign Application Priority Data

May 14, 1985 [AU] Australia .................... PH00551

[51] Int. Cl.[4] ............................................. A61B 17/36
[52] U.S. Cl. ...................................... 128/303.1; 119/1
[58] Field of Search ......... 128/303 R, 303.1, 399–402, 128/DIG. 27; 119/1

[56] References Cited

U.S. PATENT DOCUMENTS

| | | | |
|---|---|---|---|
| 3,176,114 | 3/1965 | Kneisley | 128/303.1 |
| 3,358,648 | 12/1967 | Berens | 119-1/1 |
| 3,411,483 | 11/1968 | Cavoy | 128/303.1 |
| 3,515,096 | 6/1970 | Hogg | 119-1/1 |
| 3,712,306 | 1/1973 | Bryne | 128/303.1 |
| 3,794,039 | 2/1974 | Kollner et al. | 128/303.1 |
| 3,827,436 | 8/1974 | Stumpf et al. | 128/399 |
| 3,828,789 | 8/1974 | Young | 128/303.1 |
| 4,531,476 | 7/1985 | Miller | 119/1 |
| 4,646,735 | 3/1987 | Sevey | 128/303.1 |

FOREIGN PATENT DOCUMENTS 1515845  6/1978  United Kingdom .

Primary Examiner—Max Hindenburg
Attorney, Agent, or Firm—Steele, Gould & Fried

[57] ABSTRACT

In one form the invention resides in a freeze branding and/or dehorning apparatus for use with a dispenser having a nozzle for dispensing a cooling medium, said apparatus comprising a contact element comprising a delivery zone formed with an open face which is to be applied to an animal's hide or horn bud, a support for said contact element, said support being receivable on the dispenser such that the contact element is opposed to said nozzle and said nozzle is adapted to deliver the cooling medium to the delivery zone of the contact element.

14 Claims, 3 Drawing Sheets

METHOD AND APPARATUS FOR FREEZE BRANDING AND DEHORNING

This is a continuation of PCT/AU86/00127, filed May 7, 1986, published as WO86/06583 on Nov. 20, 1986.

BACKGROUND OF THE INVENTION

THIS INVENTION relates to treatment of livestock for the purposes of branding and/or dehorning.

As a result of research conducted in the late 1940's and early 1950's it was found that it was possible to deactivate the pigmentation functions of animal skin through the application of low temperatures and that the pigmentation function was not reactivated afterwards resulting in the production of non-pigmented hair in the region of the skin so treated. As a result of this discovery the practice of freeze branding was established whereby a brand chilled by means of dry ice and/or liquid nitrogen was applied to the coat of an animal in much the same way as known hot brands to produce a non-pigmented zone on the animal's coat which was according to the pattern of the applied brand. The difficulties in this technique however are the cost of the brands involved and the high degree of quality control required in order to produce satisfactory results. These features limited the widespread usage of the technique to those stock breeders who are able to afford to hire skilled consultants able to use the freeze branding technique.

Subsequently a further method of freeze branding was developed which involved the use of stencils which were applied to a closely clipped site on an animal's body and whereby the exposed portion of the skin was treated using liquids having a sub-zero boiling point such a Freon. Difficulties with this technique arose from the fact that the stencils had to be glued to the animal's hide and that the animals hide had to be prepared before the stencils could be so applied. The technique led to blurring of the characters being stenciled which therefor required a large area to be treated to minimise the effects of blurring which in turn required a large amount of the cooling medium.

OBJECTS OF THE INVENTION

It is an object of this invention to provide a means whereby freeze branding can be effected without the precise quality control required with the use of branding elements, which does not require the preparation required of the glued-on stencils and is able to produce more satisfactory results than is available with the stencils.

In relation to the dehorning of animals, previous methods have involved cutting of the horns from the head of an animal which can cause trauma to the animal and result in the loss of productivity due to a reduction in the increase of body weight of the animal or milk output. A further method has involved the application of a caustic paste to the horn buds of young animals which has been highly effective, however it has the disadvantage that if the horn buds become wet the run off can cause burning of the neighbouring skin and/or the eyes of the animal. In addition if the horn bud is licked by another animal it would cause burning of the mouth tissues of the licking animal. Another method of dehorning animals has involved the application of an electrically heated iron to the horn bud which again causes trauma and pain to the animal and can cause injury in the event of mis-application of the brand if the the animal moves its head during the dehorning process.

It is an object of this invention to provide a means of effectively dehorning animals without causing stress to the animal and without creating a situation where neighbouring tissues and/or other animals may be effected.

SUMMARY OF THE INVENTION

In one form the invention resides in a freeze branding and/or dehorning apparatus for use with a dispenser having a nozzle for dispensing a cooling medium, said apparatus comprising a contact element comprising a delivery zone formed with an open face which is to be applied to an animals hide or horn bud, a support for said contact element, said support being receivable on the dispenser such that the contact element is opposed to said nozzle and said nozzle is adapted to deliver the cooling medium to the delivery zone of the contact element.

According to a preferred feature of the invention wherein said contact element is formed with a recess opposed to said nozzle into which said cooling medium is deposited, said recess opening into said delivery zone through at least one aperture.

According to a preferred feature of the invention wherein the perimeter of the open face of the delivery zone is defined by a sharp raised lip.

According to a further preferred feature of the invention the lip is serrated.

According to a further preferred feature of the invention said contact element is thermally conductive.

According to a further preferred feature of the invention said contact element takes the form of a stencil wherein the delivery zone has the configuration of the indica to which the stencil relates.

According to a further preferred feature of the invention wherein the support accommodates a control means which is able to produce a sequentially timed series of deliveries of said cooling medium from said nozzle.

According to another form the invention resides in a method of freeze branding and/or dehorning horned animals comprising defining a delivery zone on the hide and/or the horn bud of the animal delivering a cooling medium to the delivery zone a liquid having a boiling point substantially less than 0° C. for a sufficient quantity to destroy the pigmentation function of the skin and/or the growth portion of the horn bud in the region of the delivery zone.

BRIEF DESCRIPTION OF THE DRAWINGS

The invention will be more fully understood in the light of the following description of the one specific embodiment. The description is made with reference to the accompanying drawings of which.

DETAILED DESCRIPTION OF THE PREFERRED EMBODIMENTS

Figure 1:
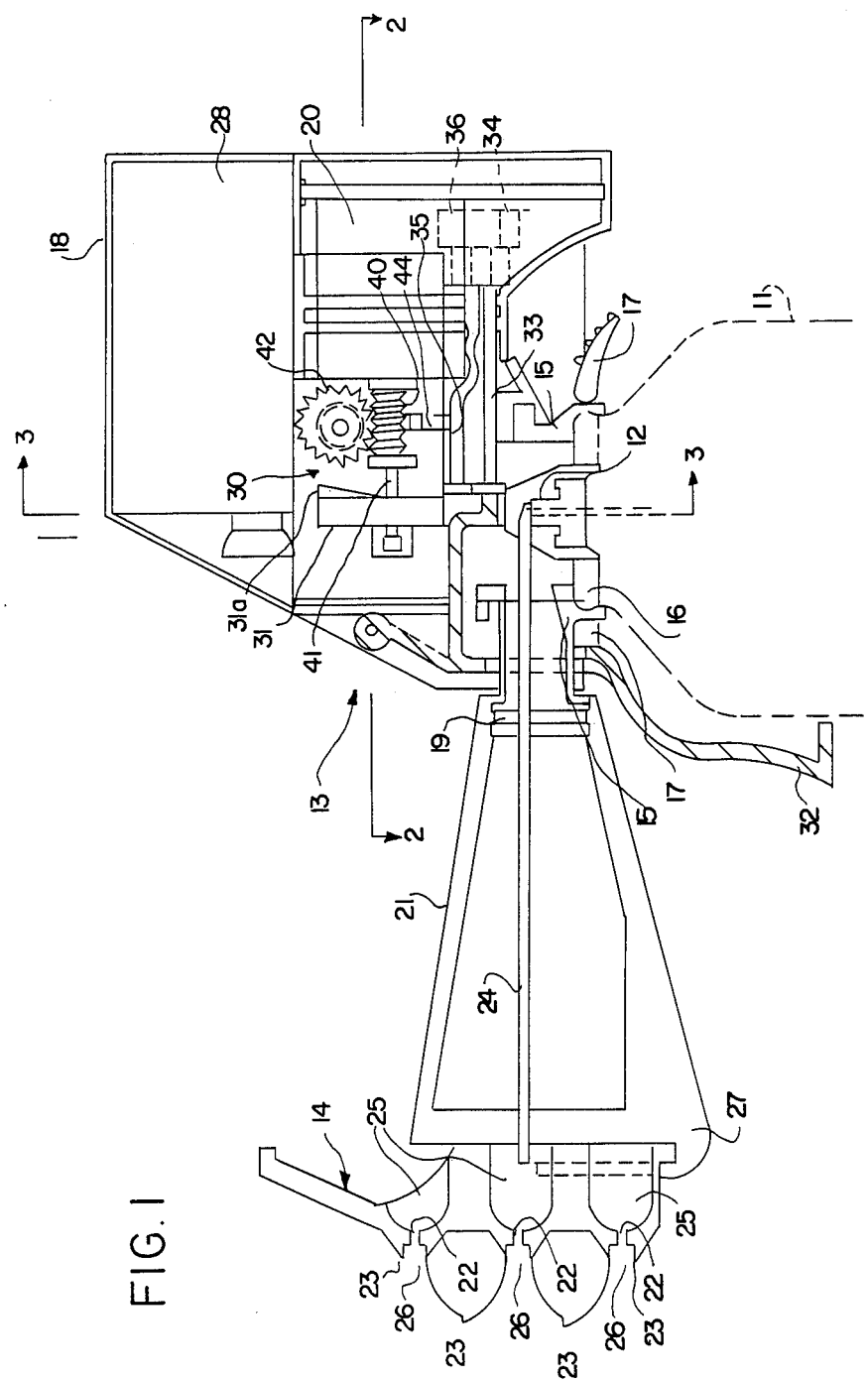
FIG. 1 is a part sectional elevation of apparatus according to the embodiment for the purposes of freeze branding.
Figure 2:
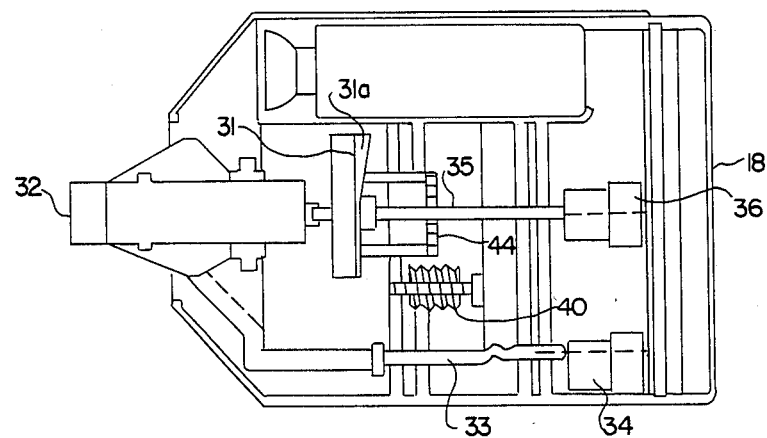
FIG. 2 is a sectional plan view along line 2—2 of FIG. 1.
Figure 3:
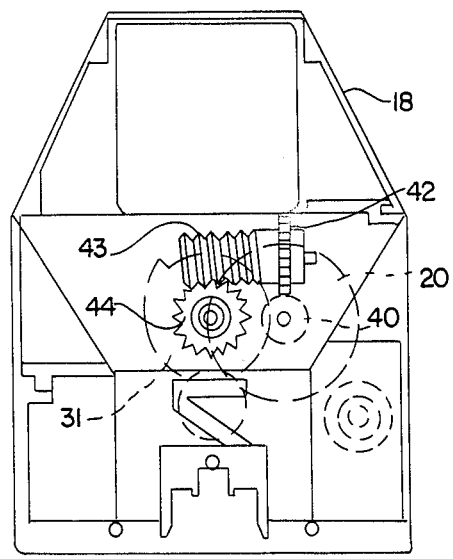
FIG. 3 is a part sectional end elevation along line 3—3 of FIG. 1.
Figure 4:
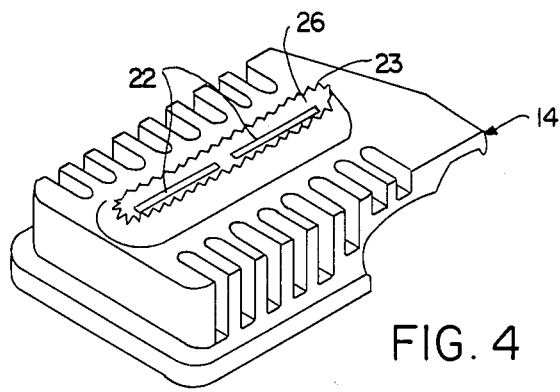
FIGS. 4 and 5 are isometric views of two forms of contact elements which take the form of stencils.
Figure 5:
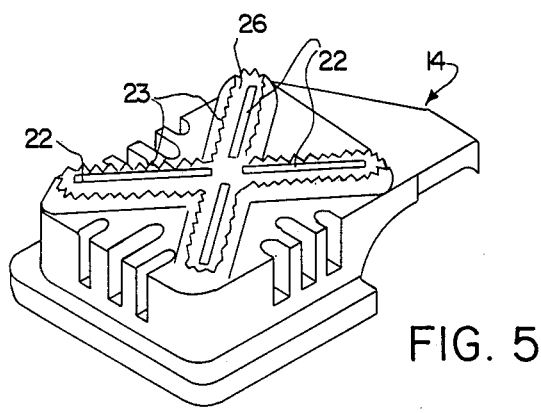

The embodiment is directed towards an apparatus which may be used in both the freeze branding of animals and the dehorning of horned animals. The embodiment comprises an aerosol can 11 containing a liquified gas such as Freon for use as both a propellant and as a coolant together with an agent for rendering the animals coat thermally conductive. The aerosol can 11 is associated with a conventional form of delivery nozzle. In addition the aerosol can 11 is associated with a support structure 13 for a contact element 14 which is held in spaced relation to the nozzle 12. In the case of the embodiment as shown at FIG. 1 the contact element 14 takes the form of a stencil and is preferably formed of a thermally conductive material.

The interengagement between the can 11 the support ring 15 and locking ring 17 facilitates a rigid interengagement between the can and support structure whereby the can may be used as the handle if desired.

The particular support structure 13 shown at FIG. 1 comprises a support ring 15 which is engagable over an upstanding lip 16 formed on the upper surface of an aerosol can 11. The support ring 15 is associated with a locking ring 17 which is engageable over the the support ring 15 to bring it into clamping engagement with the lip 16. The support ring 15 carries an upstanding bracket 19 which is to be located in opposed relation to the outlet of the nozzle 12 and is formed with an aperture which pivotally supports a support frame 21 extending outwardly from the nozzle 12. The support frame 21 carries at its outer end means for engaging and retaining the contact element 14. As a result of the pivotal relationship between the bracket 19 and support frame 21 the contact element 14 is capable of relative transverse movement with the nozzle 12. An overflow reservoir 27 is located on the support frame 21 below the contact element 14.

The nozzle of the aerosol can 11 fitted with a delivery tube 24 which passes through an opening formed in the upstanding bracket 19 and the inner end of the support frame 21 to extend into the first recess 25 of the stencil 14.

The upstanding bracket 19 further supports a housing 18 which accommodates a drive motor 20, battery pack 28 and drive train 30 which is associated with the drive motor 20 to cause rotation of a cam 31 which bears on the nozzle 12. A trigger 32 is pivotally supported from the support bracket 19 and is provided with an extension which is in opposed relation to a control button 33 associated with a switch 34 whereby on depression of the trigger 32 the control switch 34 will close to cause rotation of the cam 31 by the drive motor through the drive train 30. The cam 31 is of an eccentric circumferential configuration and has its outer periphery located directly above the nozzle. The housing 28 supports a base member 12 which is receivable over the nozzle of the can 11 and is slidable in the housing. The end of the boss 12 which is in engagement with the periphery of the cam 31 is formed with a resilient extension which will accommodate for variations in the dimensions of the nozzles of the can without causing depression of the nozzle. On rotation of the cam 31 the boss 12 engages the nozzle which is depressed for a portion of the travel of the cam. The cam 31 is also formed with an axial enlargement 31a at the portion of the greatest radial enlargement. The axial enlargement 31a is associated with second control button 35 which in turn is associated with a second control switch 36. On activation of the drive motor 20 through the first control switch 34 by the depression of the trigger 32 the cam is caused to rotate causing periodic depression of the nozzle 12 and delivery of cooling medium to the first recess 25. With rotation of the cam 31 the second control switch 36 is closed whenever the nozzle is being depressed by the cam. On the trigger 32 being released the second switch 36 will maintain the flow of current to the motor while the nozzle is being depressed and will stop the motor 20 on the cam 31 disengaging from the nozzle and the second control button 35.

The drive train 30 between the cam 31 and motor 20 comprises a first worm gear 40 on the drive shaft 41 of the motor which drives a first spur gear 42 also having a second worm gear 43 associated therewith. The second worm gear drives a second spur gear 44 supported on the shaft carrying the cam 31.

The function of the cam is to control the consumption of the cooling medium and to provide an environment in the delivery zone of both the stencil contact element and the dehorning contact element for a sufficient length of time to achieve the desired results in the skin or horn bud respectively. As a result a metered quantity of cooling medium is delivered to the delivery zone for the required period of time. Such delivery zone is effected by causing the nozzle to be activated at sequential timed intervals throughout the period of application. If desired the drive motor may be associated with a timer whereby time of operation of the drive motor can be varied according to the users requirements. As a result of the control mechanism the consumption of cooling medium is controlled such that a satisfactorily low temperature environment is produced at the delivery zone of the apparatus for the desired length of time without the excessive consumption of the cooling medium that would occur if the nozzle were depressed for the duration of application and without intervention by the operator. The only function required of the operator is the application of the open face of the delivery zone of the contact element to the area to be treated, the maintenance of the desired pressure at the contact zone and the operation of a trigger mechanism which operates the drive motor for the control mechanism.

The face of the stencil contact element 14 opposite the nozzle is formed with a patterned recess 25 which has the configuration of an alpha-numeric character or any desired device while free face of the stencil is formed with a second recess 26 which comprises the delivery zone and has a configuration corresponding to that of the first recess. The recesses communicate with each other through a slot shaped apertures 22. The edges of the second recess are defined by a sharp upstanding serrated lip 23 which define a comb-like edge at the outer face of the stencil 14 around the second recess 26. The body of the contact elements is formed with fins to facilitate the absorption of heat by the contact element in regions not part of the delivery zone.

In use the support structure 13 is fitted to an aerosol can 11 and the desired stencil 14 is fitted to the outer end of the support frame 21 of the support structure 13. In fitting the stencil 14 to the support structure 13 the delivery tube 24 is caused to extend into the first recess 25 formed in the stencil 14. The stencil 14 is then applied against the coat of an animal and pressure is applied whereby the portion of the coat covered by the open face of the second recess 26 is compressed. The trigger 32 is then depressed causing the contents of the aerosol can 11 to be delivered into the aperture and the can 11 is pivotted in relation to the support structure 13 such that the free end of the delivery tube moves throughout the length of the first recess 25. As a result the cooling medium together with the thermal transmission medium carried by the aerosol can is delivered into a delivery zone defined by the second recess 26 causing cooling of the portion of the coat covered by the second recess 22 and the portion of the skin directly underneath that portion of the coat. The function of the lip 23 around the second recess is to prevent undue leakage of the medium to the surrounding portions of the coat while the conductive nature of the stencil 14 ensures the transfer of heat from the surroundings to prevent any undue cooling thereof of the coat in contact with the body of the stencil which is not part of the delivery zone. Any overflow of the cooling medium is collected by the overflow reservoir 27 to evaporate therein clear of the animal's coat.

It has been found that if the delivery zone of the stencil is wet with water on being applied to the animals hide such water will freeze on the delivery of the casting medium to the stencil and serve as a seal around the delivery zone to prevent the leakage of the cooling medium. This results in a very distinct brand being produced. Therefore it is preferable that the serrated tip 23 have a configuration which promotes the retention of water between the serrations and that the tip be such as to retain a film of water.

Figure 6:
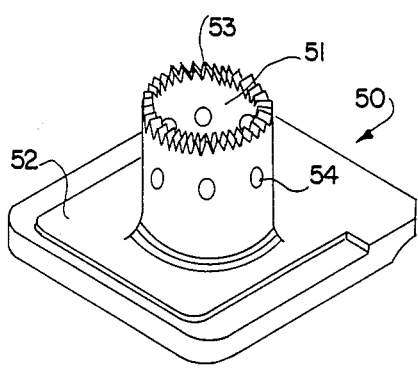
FIGS. 6 and 7 are an isometric view and a sectional elevation of a contact element used for dehorning.
Figure 7:
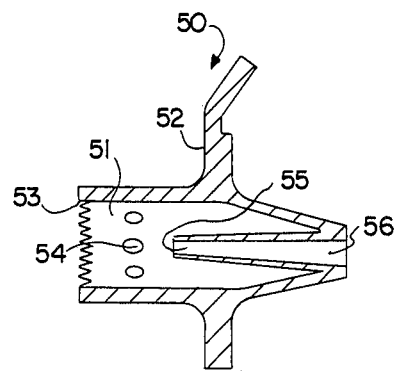

To effect dehorning of an animal the stencil contact element 14 of FIG. 1 is removed from the frame 21 and a dehorning contact element 50 (see FIGS. 6 and 7) is applied thereto. The dehorning contact element 50 comprises a cylindrically shaped chamber constituting the delivery zone 51 on the free face of a base 52 of the element which is fixed to the support frame 21. The free outer edge of the element defining the delivery zone 51 is formed with a serrated lip 53 while the walls of the chamber are provided with several apertures 54. The inner face of the delivery zone 31 is formed a recess 56 having an aperture 55. The delivery tube 24 from the nozzle 12 extends into the recess 56. The lateral dimensions of the delivery zone 51 are such that the serrated lip 53 would surround the horn bud of an animal which is to be dehorned.

In use the serrated lip of the dehorning element 50 is applied over the horn bud of an animal to surround the bud and the cooling medium and thermal transmission medium is applied to the horn bud for a sufficient length of time and in sufficient quantity to destroy the activity of the epithelial germ cells of the horn bud to prevent any further growth of the horns. The dehorning element 50 is preferably formed of a thermally conductive material in order to ensure that the area surrounding the horn bud is not affected by the cooling medium. The sharp serrated lip 53 serves to prevent any escape of the cooling medium from the perimeter of the dehorning element. The apertures 54 in the side wall of the chamber serve to allow the escape of the evaporating gas from the delivery zone 51.

By the use of the dehorning element of the embodiment it has been found that by producing a subzero freezing environment in the immediate region of the horn bud the activity of the epithelial germ cells of the horn bud can be destroyed and/or retarded sufficiently to prevent the further growth of the horns without causing any undue trauma or pain to the animal or affecting any of the surrounding tissues or affecting any other animals which may come into contact with the horn bud after treatment.

As a result of the embodiment of the function of freeze branding and/or dehorning which usually requires a high degree of quality control and accuracy can be produced by a relatively unskilled operator.

It should be appreciated that the scope of the present invention need not be limited to the particular scope of the embodiment described above. In particular the invention need not be limited to use with an aerosol dispenser but may be used with any suitable dispenser able to deliver a cooling medium to the contact element. In addition the cooling medium may take any desirable burn and may include liquid air nitrogen or the like.

I claim:

1. A freeze branding and/or dehorning apparatus for use with a dispenser having a nozzle for dispensing a cooling medium, said apparatus comprising a contact element comprising a delivery zone formed with an open face which is to be applied to an animal's hide or horn bud, the perimeter of the open face of the delivery zone is defined by a sharp raised serrated lip, a support for said contact element, said support being receivable on the dispenser such that the contact element is opposed to said nozzle and said nozzle is adapted to deliver the cooling medium to the delivery zone of the contact element wherein the contact element is supported by said support by a pivotable means enabling movement of the nozzle transversely to an axis extending between the nozzle and the contact element.

2. A freeze branding and/or dehorning apparatus as claimed at claim 1 wherein said contact element is formed with a recess opposed to said nozzle into which said cooling medium is deposited, said recess opening into said delivery zone through at least one aperture.

3. A freeze branding and/or dehorning apparatus as claimed in claim 1 wherein the contact element is thermally conductive.

4. A freeze branding apparatus as claimed in claim 1 wherein the contact element takes the form of a stencil wherein the delivery zone has the configuration of the indicia to which the stencil relates.

5. A dehorning apparatus as claimed in claim 1 wherein the delivery zone has an open face conforming to the dimensions of a horn bud.

6. A freezing and/or dehorning apparatus as claimed in claim 1 wherein the support accommodates a control means which is able to produce a sequentially timed series of deliveries of said cooling medium from said nozzle.

7. A freezing and/or dehorning apparatus as claimed in claim 6 wherein said control means is able to effect a sequentially timed series of deliveries of said cooling medium for a predetermined period of time.

8. A freezing and/or dehorning apparatus as claimed in claim 6 wherein the control means comprises an eccentric cam driven from a drive motor said cam being adapted to bear on the activation means for said nozzle to effect a delivery of cooling medium at least once during each rotation of the cam.

9. A freeze branding and/or dehorning apparatus as claimed in claim 1 wherein said dispenser comprises an aerosol dispenser.

10. A freeze branding and/or dehorning aparratus as claimed at claim 9 wherein the cooling medium comprises a mixture of freezers and an agent for rendering an animals coat thermally conductive.

11. A freeze branding and/or dehorning apparatus as claimed in claim 9 wherein the apparatus is adapted to be rigid by lockingly engaged with the dispenser.

12. A freeze branding and/or dehorning apparatus as claimed at claim 11 wherein said adaption comprises a support ring of variable diameter on said apparatus receivable over a portion of the body of the dispenser and a locking ring of fixed diameter which is slidable over the support ring to effect said locking engagement.

13. A method of freeze branding comprising applying to the treatment area means for defining a treatment zone having the configuration of an alpha numeric character or combination of characters wherein said means is able to restrict liquid flow beyond the perimeter of the treatment zone via a serrated lip, said defining means being open to atmosphere, said method further comprising delivering throughout the length of the treatment zone a cooling medium having a boiling point substantially less than 0° C., the delivery of said cooling medium being periodic whereby a controlled quantity of cooling medium is delivered to the treatment zone and the delivery of said cooling medium is for an interval of time sufficient to lower the temperature of the skin in the treatment zone sufficient to destroy the pigmentation function of the hair follicles but not destroy the hair follicles.

14. A method of dehorning livestock comprising applying to the horn bud, means for defining a treatment zone closely surrounding the horn bud wherein said defining means is able to restrict liquid flow beyond the perimeter of the treatment zone via a serrated raised edge, said defining means being open to atmosphere, said method further comprising delivering throughout the length of the treatment zone a cooling medium having a boiling point substantially less than 0° C., the delivery of said cooling medium being periodic whereby a controlled quantity of cooling medium is delivered to the treatment zone and the delivery of said cooling medium is for an interval of time which is sufficient to lower the temperature of the tissue at the treatment zone sufficiently to destroy the growth function of the horn bud.

* * * * *